(12) United States Patent
Benitsch et al.

(10) Patent No.: US 7,238,414 B2
(45) Date of Patent: Jul. 3, 2007

(54) FIBER-REINFORCED COMPOSITE FOR PROTECTIVE ARMOR, AND METHOD FOR PRODUCING THE FIBER-REINFORCED COMPOSITION AND PROTECTIVE ARMOR

(75) Inventors: Bodo Benitsch, Buttenwiesen (DE); Michael Heine, Allmannshofen (DE); Sven Schweizer, Augsburg (DE); Rainer Zimmermann-Chopin, Dornstadt (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/852,960

(22) Filed: May 24, 2004

(65) Prior Publication Data

US 2007/0116939 A1    May 24, 2007

Related U.S. Application Data

(63) Continuation of application No. PCT/EP02/13122, filed on Nov. 22, 2002.

(30) Foreign Application Priority Data

Nov. 23, 2001    (DE) ................... 101 57 487

(51) Int. Cl.
  *B32B 17/12*    (2006.01)
  *B32B 3/14*    (2006.01)
(52) U.S. Cl. .................. 428/293.4; 428/49
(58) Field of Classification Search ........ 428/284, 428/49, 304.4, 368, 367, 401, 375, 293.4
  See application file for complete search history.

(56) References Cited

U.S. PATENT DOCUMENTS 4,068,037 A * 1/1978 Debolt et al. ............ 428/368
5,015,540 A * 5/1991 Borom et al. ............ 428/698
5,114,772 A * 5/1992 Vives et al. ............. 428/49
6,030,913 A   2/2000 Heine et al.
6,314,858 B1  11/2001 Strasser et al.
6,716,376 B1 * 4/2004 Haug et al. ............ 264/29.1

FOREIGN PATENT DOCUMENTS

| CA | 2325123 | 11/2000 |
|---|---|---|
| DE | 197 10 105 A1 | 9/1998 |
| DE | 198 05 868 A1 | 10/1999 |
| DE | 198 56 597 A1 | 4/2000 |
| DE | 199 53 259 A1 | 5/2001 |
| EP | 0 518 589 A1 | 12/1992 |
| EP | 0 994 084 A1 | 4/2000 |
| WO | 98/51988 | 11/1998 |

* cited by examiner

*Primary Examiner*—N. Edwards
(74) *Attorney, Agent, or Firm*—Laurence A. Greenberg; Werner H. Stemer; Ralph E. Locher

(57) ABSTRACT

A fiber-reinforced composite body containing a first zone made of a ceramic matrix, which predominantly contains silicon carbide and, optionally, silicon and/or carbon and/or compounds thereof, and containing a second zone, which is located on a surface of the ceramic matrix zone and formed form a fiber-reinforced C/SiC ceramic. The fiber length decreases from the exterior of the fiber-reinforced ceramic zone up to the first zone and, optionally, up to one or more other zones that are arranged on the second zone. A method for producing the composite body is characterized by involving a joint infiltration at least of the first zone and of the second zone with liquid silicon and by the carrying out of a siliconization. A composite body of this type can be used, in particular, as armoring in the civil or military sectors.

21 Claims, No Drawings

FIBER-REINFORCED COMPOSITE FOR PROTECTIVE ARMOR, AND METHOD FOR PRODUCING THE FIBER-REINFORCED COMPOSITION AND PROTECTIVE ARMOR

CROSS-REFERENCE TO RELATED APPLICATION

This application is a continuation, under 35 U.S.C. § 120, of copending international application No. PCT/EP02/13122, filed Nov. 22, 2002, which designated the United States; this application also claims the priority, under 35 U.S.C. § 119, of German patent application No. 101 57 487, filed Nov. 23, 2001; the prior applications are herewith incorporated by reference in their entirety.

BACKGROUND OF THE INVENTION

Field of the Invention

The present invention relates to protective armor that is suitable for civilian and military applications. In particular, the present invention relates to a body containing composite materials having a matrix which contains predominantly silicon carbide, silicon and carbon and/or compounds thereof and is formed by silicization of carbon-containing materials. The body is formed with a first ceramic zone containing predominantly the components of the common matrix, and a second zone that is located behind the first zone and is formed by a C/SiC ceramic reinforced with short fibers. The fiber length in the second zone decreases gradually in the direction of the interface with the first zone. Optionally, one or more further zones are provided and are reinforced with long fibers and is disposed behind the second zone. The invention also relates to a process for producing the body containing the composite material and particularly advantageous uses of the composite material.

In the civilian sector, which concentrates, inter alia, on personal protection, armored limousines and protective vests, parts having complex shapes are demanded. This is coupled, in particular, with the requirement for the smallest possible component thickness or installation depth and a low weight. Provision of protection against heavy weapons or medium and large caliber tends to be of minor importance in the civilian sector. However, the distance to the threat is usually quite short and can be only a few meters. This results in the problem that multiple hits that frequently occur lead to points of impact that are close together. This results in very high demands in terms of the multi-hit performance of the protective armor.

For armor in the military sector, use is nowadays frequently made of flat plates as additional armor for land and water vehicles and for helicopters, containers and shelters or field fortifications. The configuration of the armor assumes a threat from high-velocity and large caliber projectiles. However, the large distances to the targets result in a generally wide spacing between hits. For this reason, the requirements for multi-hit performance are lower than in the civilian sector.

An armor steel plate is, for example, treated so that it is extremely hard and thus projectile-breaking on the side facing the threat. The other side is hardened very little in order to absorb the energy of the projectile. The typical structure of armor plate made of other materials is also based on these considerations.

The in-principle structure of armor incorporating ceramic materials preferably is formed of at least two layers or zones. The ceramic plate, which represents the front plate, has the task of deforming the projectile and, particularly in the case of armor piercing munitions, breaking the hard core. A deformable armor located behind the ceramic plate, viz. the backing, has the task of taking up the projectile, projectile fragments and ceramic splinters and stabilizing the remaining ceramic plate. The backing generally contains highly stretchable and tear-resistant fabrics (aramid fiber fabrics, HDPE fabrics, etc.) or metal, or plastics. Further layers of fabrics or metal plates can be added in front of, between and behind these two main components.

U.S. Pat. No. 5,114,772 discloses a two-layer composite. The first layer contains a sintered ceramic that is disposed in the form of individual pieces or segments. The layer located beneath this contains a fiber-reinforced porous composite material whose matrix is formed by gas-phase infiltration or precursor infiltration. The two layers are typically bonded by an adhesive. It is likewise possible to introduce the sintered ceramic into the surface of the body containing reinforcing fibers that forms the lower layer before it is after-densified by a ceramic matrix. Disadvantages of this process of gas-phase infiltration are the long process times and the residual porosity that always remains in the composite ceramic. Precursor infiltration also suffers from similar disadvantages, but in this case there is the additional necessity of carrying out a plurality of infiltration/ceramicization cycles.

Since the monolithic ceramic displays typical brittle fracture behavior when a projectile hits it, ceramic plates rupture to form many coarse to very fine splinters. Owing to the formation of splinters when impact of a projectile occurs, the use of ceramic plates without additional backing is not practical. Likewise, impact of a projectile generally results in complete destruction of the respective ceramic plates. As a result, multiple hits cannot be withstood. The required multi-hit performance is thus not provided and may be able to be achieved only by complicated segmentation of individual monolithic ceramic plates.

To reduce this catastrophic materials behavior of ceramics, Published European Patent Application EP 0 994 084 A1 proposes the use of fiber-reinforced SiC or C/SiC (carbon-fiber reinforced SiC). The shaped body contains a woven fabric or knitted fabric or the like of carbon fibers that is converted into silicon carbide reinforced with carbon fibers by infiltration with liquid silicon in a silicization process. The side facing the impact should be harder than that facing the backing structure, which is achieved by variation of the type of fiber reinforcement or by the amount of fibers introduced into the shaped body. In a further process for producing C/SiC, Published, German Patent Application DE 199 53 259 A1, coated short fibers are used in place of the long fibers described in Published, European Patent EP 0 994 084 A1. This material has a good multi-hit performance.

Disadvantageous of the processes described is that they make it possible to produce only composites whose hardness cannot match that of the monolithic ceramic on the side facing the impact. The projectile-breaking action of the protective armor presented decreases as a result.

International Patent Disclosure WO 98/51988 A1, corresponding to U.S. Pat. No. 6,314,858, discloses a composite having a multilayer structure as a protective armor. The composite contains at least one hard layer and at least one layer that has a higher impact toughness or is more ductile, with the layers being disposed alternately on top of one another. The hard layer contains a ceramic material which has fibers and, if desired, fillers dispersed therein. The hardness or ductility of this layer can be adjusted via the type, shape and content of the fibers. The softer layer is formed, for example, by carbon fibers, with the increase in ductility being achieved by a larger amount of fibers. Preference is given to a plurality of hard and ductile layers being provided within the composite in order to absorb the kinetic energy released by the projectile.

A further process for producing C/SiC bodies composed of layers of materials having different properties, which is intended for use in producing ceramic brake disks, is described in Published, Non-Prosecuted German Patent Application DE 198 05 868 A1, which corresponds to U.S. Pat. No. 6,716,376. Here, various pressing compositions are pressed in a single pressing step to form a composite which has at least two final layers of a CMC composite material, in particular of C/SiC, to finish, with the fibers in the two layers having various protective coatings, fiber lengths or proportions. In particular, the technology of the shaped bodies described is that the outer layer, viz. the friction layer of a brake disk, consists predominantly or entirely of silicon carbide, since the fibers of the friction layer are predominantly or even completely consumed in the silicization process.

However, the known composite materials do not have a sufficiently high projectile-breaking action at the desired thickness or weight per unit area.

SUMMARY OF THE INVENTION

It is accordingly an object of the invention to provide a fiber-reinforced composite for protective armor, and a method for producing the fiber-reinforced composition and protective armor which overcome the above-mentioned disadvantages of the prior art devices and methods of this general type, which ceramic compound, at a low weight per unit area, has, first, a high projectile-breaking action and, second, good multi-hit performance. The composite should be produced in a simple and inexpensive process, with any different zones or layers of material being joined permanently to one another in a single process step. In production and use, stresses occurring as a result of different coefficients of thermal expansion of zones should be avoided. For example, the typical coefficient of expansion of hard ceramic materials containing SiC, SiSiC or C/SiC (with a high SiC content) is in the range from about 2.5 to $5 \times 10^{-6}$ $K^{-1}$, while the typical coefficient of expansion of C/SiC reinforced with short fibers is in the range from about 0.5 to $3 \times 10^{-6}$ $K^{-1}$. The process also has to make it possible to produce complex structures.

With the foregoing and other objects in view there is provided, in accordance with the invention, an at least partly fiber-reinforced composite having a matrix made predominantly from silicon carbide, silicon and carbon, and formed by silicization of a carbon-containing material. The composite contains a first monolithic ceramic zone formed predominantly from silicon carbide, silicon and carbon, and a second zone containing a composite ceramic reinforced with fibers and disposed on one of the sides of the first monolithic ceramic zone. The fibers have a fiber length or the fiber length together with a fiber bundle thickness increase gradually in the second zone from a side facing the first monolithic ceramic zone to a side facing away from the first monolithic ceramic zone.

According to the invention, the object is achieved by provision of a multi-zone, at least partly fiber-reinforced composite having at least two zones. The first zone, which represents the projectile-breaking zone, is formed by a monolithic ceramic which contains predominantly silicon carbide and, if desired, silicon and/or carbon and/or compounds thereof. The second zone is located on the side of the first zone which is opposite the projectile-breaking surface and is formed by a C/SiC ceramic reinforced with short fibers, with the fiber length decreasing gradually from the outside of the fiber-reinforced ceramic zone in the direction of the first zone.

Furthermore, the invention provides a process for producing such a composite, in which the carbon-containing intermediate bodies of the first and second zones are brought to the desired composition by liquid silicization and are permanently joined to one another by the formation of a common matrix phase.

The joint silicization of the zones or layers used in each case results in a composite that has at least two zones having different mechanical and thermophysical properties. A layer of, for example, a material reinforced with long fibers can be applied as a third zone to the second zone. The function of the third zone is, in particular, to take up splinters that are formed from the first and possibly the second zone.

Such a composite is particularly preferably used as protective armor, for example in the vehicle sector and also as protective vests. The layers are the first projectile-breaking layer and the second multi-hit-resistant zone. The second zone can, in particular, stop projectiles that are close to one another. The second zone is, in particular, characterized in that it does not shatter like conventional monolithic ceramic. The gradated structure achieved by the fiber length of the fibers within the second zone makes it possible, in particular, to achieve matching to the coefficients of expansion of the adjoining first zone. This matching is of critical importance to the production process of liquid silicization, since cooling from the silicization temperature in the case of unmatched coefficients of expansion results in considerable internal stresses which can lead to cracks and spalling.

The short fibers of the second zone are preferably present in the form of bundles held together by carbon-containing compounds. In the following, the term fibers always also encompasses fiber bundles.

The first layer containing the monolithic ceramic is, in particular, characterized by a high hardness. The structure according to the invention having the first and second zones makes it possible for the first zone not to shatter after a bullet impact and lead to total failure of the entire composite, but instead at worst tear because the second zone holds the first zone together. Liquid infiltration with silicon makes it possible to join the zones having very different physical properties sufficiently strongly to one another and to convert the porous carbon-containing shaped bodies to differing degrees into monolithic SiC and matrix sic.

In a very particularly preferred embodiment, the composite is made up of a plurality of ceramic zones, some of which are fiber-reinforced, particularly preferably three zones. It is likewise possible to provide a plurality of sequences of these two or more zones.

The structure containing at least the first zone and the second zone results in a gradual transition of the materials properties important for the projectile-stopping behavior and of the thermal behavior from the side facing the impact to the side facing away from the impact, so that the hardness decreases and the ductility and fracture toughness increase.

The individual zones are described in detail below.

First Zone:

The projectile-breaking action of the first zone is produced by an extremely hard pseudomonolithic ceramic containing predominantly silicon carbide together with small amounts of silicon and carbon being produced during the process of joint silicization, also referred to as cosilicization, for producing the composite. The first zone is preferably produced using porous carbon-containing intermediate bodies that may, if appropriate, contain additional fillers and hard materials. Such carbon-containing intermediate bodies are converted by the liquid infiltration with silicon carried out later into ceramics having a high SiC content. The mass fraction of SiC in this zone is typically at least 50%. Preference is given to SiC contents of at least 65% and particularly preferably at least 75%.

The thickness of the ceramicized zone (first zone) can be in the range 1–100 mm, preferably in the range 1–50 mm. In a very particularly preferred variant, the thickness is in the range 2–15 mm, or, in particular, 3–10 mm. Furthermore, preference is given to the thickness of the first zone being about 20–60% of the thickness of the fiber-reinforced composite.

The carbon-containing intermediate body of the first zone provided for later silicization is preferably formed by starting materials having a high carbon content or volume, with graphite material and compacted carbon fiber felt being advantageous.

In a further embodiment of the invention, the first zone is provided with stress relief grooves. The formation of stress relief grooves or preferred points of fracture is achieved according to the invention by a regular or irregular network of furrows, grooves or cracks having a depth in the region of at least 20–95%, preferably 20–99% and very particularly preferably 20–100%, of the thickness of the intermediate body and a width of less than about 1 mm being provided over the entire carbon-containing intermediate body. This can be achieved in a conventional manner, for example by embossing, stamping or milling, particularly preferably prior to silicization.

To form the carbon-containing intermediate body, it is possible to use woven carbon fiber fabrics, knitted fabrics or lay-ups that are converted essentially completely into SiC by the silicization carried out later. The carbon content of felt, woven or knitted carbon fiber fabrics and carbon fiber lay-ups can be increased by liquid impregnation with a pyrolyzable organic material giving a high pyrolytic carbon yield, in particular pitch and phenolic resin, with pyrolysis of the organic material being able to be carried out prior to or after assembly of the two or more zones of the intermediate bodies.

The silicon carbide content can be increased by afterimpregnation of the presilicized and partly porous, integral shaped carbon body with precursors that form silicon carbide and pyrolysis of these.

The reactivity of the carbon-containing intermediate body is set so that after silicization it gives a high silicon carbide content of the ceramicized body, with the mass fraction of silicon carbide preferably being at least 50%, particularly preferably at least 65% and very particularly preferably at least 75%, based on the total mass of the material of the first zone.

According to a further preferred embodiment of the present invention, the carbon-containing porous intermediate body for the first zone can further contain hard materials selected from among compounds of N, B, Al, C, Si, Ti, Zr, W, in particular TiC, $TiS_x$, $TiB_x$, TiC, WC, $B_4C$, SiC, BN, $Si_3N_4$ and SiCBN ceramics. Particular preference is given to using materials based on borides, carbides, silicides and nitrides of the above-mentioned metals or mixtures thereof. During the silicization, such fillers or hard materials are firmly bound into the matrix containing predominantly silicon carbide, silicon and carbon, and/or compounds thereof.

In the following, the term matrix is also employed when only SiC occurs as hard material.

It is likewise possible to add metal powder to the first zone, so that the metal powder reacts to form carbides, silicides or borides in a high-temperature treatment. Possible metal powders include, in particular, boron, silicon and titanium. For the resulting fiber-reinforced composite to have a low density, in particular when it is used as protective vests, it is advantageous for such hard materials or metals and the compounds resulting therefrom to have a low density and at the same time a high hardness.

The mass fraction of all the above-mentioned fillers and metals is preferably 20–50% and very particularly preferably 20–30%, based on the mass of the starting mixture (prior to silicization) for the first zone.

Second Zone:

The multi-hit performance wanted in the composite of the invention is achieved by the second zone being formed by a ceramic which is reinforced with short fibers and whose matrix contains predominantly silicon carbide, silicon and carbon, with the second zone being characterized by it allowing a gradual transition of the materials properties from hard and brittle, as is the case for the first zone, to tough or ductile. As has been stated at the outset, the gradual transition is achieved by a gradated structure in terms of the fiber length in the fiber-reinforced ceramic, with the fiber length decreasing in the direction of the interface with the first zone.

A generic process for producing C/SiC ceramics reinforced with short fibers is known from, for example, the Published, Non-Prosecuted German Patent Application DE 197 10 105 A.

It is indicated in Published, Non-Prosecuted German Patent Application DE 198 56 597 A and Published, European Patent Application EP 0 994 084 A that the fracture toughness can be influenced by the type of fiber reinforcement and by varying the fiber content.

In contrast to the prior art cited, a pseudomonolithic ceramic is used as projectile-breaking outer layer according to the invention and this is adjoined to a fiber-reinforced ceramic, with the gradated structure of the second zone being achieved by varying the fiber length.

The critical thermophysical and mechanical properties in the transition zone between the first and second zones are surprisingly determined by the fiber length distribution.

According to the invention, preference is given to using fibers and fiber bundles that have been protected against silicization by a single-layer or multilayer carbon-containing coating produced by pyrolysis and/or graphitization of resin or pitch impregnations in the second zone. For the purposes of the present invention, carbon-containing coatings include carbides since these are likewise suitable as protective layer against silicization.

According to the invention, the fiber length is gradually altered within the second zone so that it increases from the side of impact, i.e. from the first zone to the other zone surface. The fiber length here is the mean fiber length. The fiber length on the one side (facing zone 1) is typically not more than about 0.01 mm and increases continuously or in steps to up to 50 mm at the other side. The fibers are preferably divided into fractions whose mean length is in the range from 0.01 to 50 mm, preferably from 0.01 to 20 mm and particularly preferably from 0.1 to 10 mm. The fiber length gradient as the ratio of longest fiber length to shortest fiber length can change uniformly or in steps and is typically in the range from 5 to 2000, preferably above 5 and particularly preferably above 10. If fiber bundles are present, the gradient of the fiber length is typically coupled with a gradient in the fiber bundle thickness, with the fiber bundle thickness increasing from the side facing the first zone to the opposite side. The mean fiber bundle thickness (in the case of round bundles, the diameter) is typically at least about 8 µm or one monofilament diameter on the one side and not more than 3000 µm on the other side. The ratio of the thickest fiber bundle to the thinnest fiber bundle can change uniformly or in steps and is typically in the range from 10 to 630, preferably above 20 and particularly preferably above 30.

According to the invention, the prepared fibers or fiber bundles are mixed with a pyrolyzable binder and converted into a pressable mixture. To increase the carbon content of the porous carbon intermediate body manufactured therefrom, graphite or carbon powder can be added to the pressable mixture. To adjust the carbon content, pulverulent ceramic materials and/or ceramic formers can be added to the pressable mixture.

The additives that have been described for use in the first layer can also be employed in the second zone. The mass fraction of these additives in the second zone is usually lower than in the first zone, preferably at least 5%, based on the mass of this zone.

Further Zones:

According to the invention, it is possible to apply a further zone (third zone) or a plurality of further layers to the free surface of the second zone of the above-described composite. If such a zone is applied, it is particularly preferred that such a third zone has the highest ductility among the three specified zones. Such a layer is preferably made up of a composite ceramic which is reinforced with long fibers and whose matrix consists essentially of SiC, Si and C.

The long fiber reinforcement is formed by singly or multiply coated fibers, woven fabrics, lay-ups or knitted fabrics whose fibers are preferably aligned predominantly within the plane perpendicular to the direction of impact. The coating is preferably formed by a single-layer or multilayer carbon layer produced by pyrolysis and/or graphitization of resin or pitch impregnations. The mean fiber length is usually greater than 50 mm, preferably greater than 100 mm and particularly preferably greater than 200 mm.

The third layer is preferably subjected to liquid silicization together with the first and second layers.

Essentially all high-temperature-resistant oxidic and non-oxidic fibers are conceivable for the reinforcing fibers used for the various zones discussed above. Preference is given to nonoxidic ceramic fibers based on one of the elements carbon, silicon, boron and/or nitrogen and/or compounds of at least two of these elements. These will hereinafter also be referred to as "SiCBN ceramics". Particular preference is given to oxidized polyacrylonitrile, carbon or graphite fibers.

If the composite is made up of three zones, the thicknesses of the three zones are each preferably in the range from 0.5 to 100 mm, particularly preferably from 0.5 to 50 mm and very particularly preferably from 0.5 to 10 mm. The individual zones do not have to have the same thickness. Thus, for example, in the production of protective armor having a high multi-hit performance, it is desirable for the second zone and, if a third zone is present, this too to be thicker than the first zone. However, if a high projectile-breaking action is required, the first zone is generally made thicker than the second zone and any third zone.

Particular preference is given to the thickness ratio of zone 1 to zone 2 in the case of a two-zone structure being in the range from 1:2 to 2:1 and in the case of a three-zone structure being in the range from 1:2:2 to 2:1:1 for the zones 1, 2 and 3. The thickness ratio of zone 1 to the sum of the thicknesses of zones 2 and 3 is particularly preferably in the range from 1:0.5 to 1:10.

However, particular preference is given to making the ratio of the thicknesses of the three layers about 1 in each case.

The production of the multi-zone composite described according to the invention will be described below. In principle, the two zone, or if a third zone was used, these three zones, are superposed so that the first zone in the resulting composite is at the top and faces the direction of impact. The second zone is applied to the other surface of the first zone facing away from the impact. If a third zone is used, the third zone is applied to the free surface of the second zone. After the two or more zones have been superposed, the assembly is fixed mechanically. The actual strong or permanent bond between the layers is produced by the infiltration and silicization reaction. In contrast to the prior art, it is thus no longer necessary to carry out additional adhesive bonding of the adjoining layers in each case, so that the production of the composite according to the invention is significantly simpler and more economical than has been possible in the prior art. In this way, it is possible, in particular, to carry out the process within a shorter time and thus also at lower cost. Curved or complex geometries can also be realized in a simple fashion. This is a significant economic advantage.

In a further advantageous embodiment of the invention, the intermediate body provided for one of the exterior zones is first shaped and the material corresponding to the other zone or the further zones is applied in pulverulent, granulated or lay-up form to the intermediate body. The material is then joined by a pressing or autoclave process. The material in pulverulent or granulated form corresponding to the further zones advantageously contains pyrolyzable binders which can be cured during the pressing step.

In a further embodiment of the invention, the porous carbon-containing intermediate bodies corresponding to the individual zones or zone combinations can be adhesively bonded using a pyrolyzable adhesive. Suitable adhesives for this purpose are organic resins, in particular those based on phenolic resin. Additional materials similar to the materials of the respective zone, e.g. hard material powder, carbon powder or fibers, can be advantageously mixed into the adhesive for the particular zone. As a result of this manufacturing technique, the transition in the composition between the zones is not abrupt but continuous, so that an assembly having a high mechanical strength and, in particular, reduced internal stress can be achieved.

According to the invention, the infiltration of the integral porous body made up of at least two intermediate bodies is carried out by applying silicon in the form of powder, beds or shaped Si-donating bodies to part or all of at least one side and heating this combination under reduced pressure to a temperature above the melting point of silicon. The infiltration is preferably carried out at a temperature of from 1600 to 1800° C.

The above-described joint silicization is, according to the invention, carried out in any case to join the first and second zones to one another. However, it is also possible to apply the third zone to the assembly of the first and second zones prior to silicization and to carry out the joint silicization on the resulting three zones. Furthermore, it is likewise possible to carry out a joint silicization of the first and second zones and then to join the third zone or further zones to the resulting composite by use of a suitable adhesive, so that an at least three-layer composite results.

The above-described composite can be used, in particular, as protective armor. The composite is in principle suitable for the substantial absorption of any impact-like point loading and can therefore be used for a wide variety of purposes in protective technology. Applications of industrial interest are, in particular, use of the composites in the form of armor plates, for example for motor vehicles, in particular automobiles. In automobile engineering, body parts or body reinforcements having a complex geometry can be produced from these materials. The same applies to the production of armor for aircraft, missiles, satellites, and also trains. A particular advantage of the use of the composite described according to the invention is that it is, first, lighter than conventional protective armor made of metal and, in particular, complete fragmentation of the composite can be avoided.

It is of course also possible to equip ships with the composites described in order to protect them against projectile impact. The thickness of the composite as a whole can be made thinner when the composite is to be used, for example, as shrapnel protection, in particular as protection against grenade fragments. Finally, mention should also be made of the fact that the composite described according to the invention is also useful for protection in the civilian sector, for example in the form of an insert for protective vests or other clothing worn on the human body.

The composite described according to the invention is characterized in that the structure of the solid is retained for a very long time during the input of energy. The energy acting on the composite is transformed within the material.

Overall, the invention thus provides a composite which, first, can be produced in a simple and inexpensive way and, second, has good multi-hit performance and nevertheless a good projectile-breaking action.

Other features which are considered as characteristic for the invention are set forth in the appended claims.

Although the invention is described herein as embodied in a fiber-reinforced composite for protective armor, and a method for producing the fiber-reinforced composition and protective armor, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENTS

Example 1

To produce a ballistic protective armor according to the invention, the below described procedure is employed.

First, the above-described second zone or layer of the composite is produced. For this purpose, four pressable mixtures containing, first, fibers and fiber bundles coated with carbon material and, second, a pyrolyzable binder, each of which differ in respect of the fiber length distribution, are produced. Four fiber fractions having a maximum length of 0.5 mm, 1 mm, 2 mm and 4 mm, respectively, are used. The fractions are introduced in succession into a pressing mold, pressed to produce a plate having a thickness of about 4 mm and cured at a temperature in the range from 80 to 190° C. for a period of from 30 minutes to 5 hours, so that a length gradient of the fibers over the plate thickness is obtained.

After a thermal conversion of the binder into carbon, a 2.3 mm thick layer of densified graphite (first layer or zone) is applied to the side of the plate having the shortest fiber length by use of a graphite powder/polymer resin mixture as adhesive.

The assembly is then infiltrated with liquid silicon in a furnace at 1450 to 1850° C. and partially converted into SiC.

To produce a third layer or zone, a homogeneous plate of CFC (carbon fiber reinforced carbon) reinforced with long fibers and having a thickness of 3 mm is silicized as described above, which results in it having a density of about 1.7 g/cm$^3$.

The plate is then adhesively bonded onto the back of the second zone of the previously produced composite by use of polyurethane as adhesive.

Example 2

A composite made up of three zones is produced by a procedure analogous to example 1. The plate that is to be used for the first zone or layer is in this case provided with grooves that are disposed as a network over its entire surface. The depth of the grooves is 2 mm and their width is 1 mm.

Example 3

For a further preferred embodiment of a ballistic protective armor according to the invention in plate form, the now described procedure is employed.

First, as described in example 1, the second zone or layer of the composite is produced. For this purpose, four pressable mixtures containing, first, fibers and fiber bundles coated with carbon material and, second, a pyrolyzable binder, each of which differ in respect of the fiber length distribution, are produced. Four fractions having length distributions of below 0.5 mm, below 1 mm, below 2 mm and below 4 mm, respectively, are used. The fractions are introduced in succession into a pressing mold, pressed to produce a plate having a thickness of about 4 mm and thermally cured at 150° C. for a period of 3 hours, so that a length gradient of the fibers over the plate thickness is obtained. After the thermal conversion of the binder into carbon, an about 2.3 mm thick layer of densified graphite is adhesively bonded onto the front side of the plate having the shortest fiber length. A third layer having a thickness of 3 mm containing carbon material reinforced with long fibers is adhesively bonded onto the free surface of this zone. The entire composite is permanently joined together in a cosilicization as described above, so that a matrix of SiC, Si and C is formed. The total thickness of the composite is about 10 mm.

Example 4

In this example, the composite as described in example 3 is produced. However, the hard material $B_4C$ was additionally introduced as powder (particle size $d_{50}$<50 µm) in a proportion by mass of 30%, based on the mass of the graphite used as starting material, into the graphite of the first layer prior to the densifying pressing step.

We claim:

1. An at least partly fiber-reinforced composite having a matrix made predominantly from silicon carbide, silicon and carbon, and formed by silicization of a carbon-containing material, the composite comprising:
  a first monolithic ceramic zone formed predominantly from silicon carbide, silicon and carbon, said first monolithic ceramic zone having sides; and
  a second zone containing a composite ceramic reinforced with fibers and disposed on one of said sides of said first monolithic ceramic zone, said fibers having a fiber length and a fiber bundle thickness, the fiber length or the fiber length in conjunction with the fiber bundle thickness of said fibers increasing gradually in said second zone from a side facing said first monolithic ceramic zone to a side facing away from said first monolithic ceramic zone.

2. The composite according to claim 1, further comprising a third zone formed of a composite ceramic reinforced with further fibers and having a matrix containing predominantly silicon carbide, silicon and carbon and/or compounds thereof, said third zone is disposed on an exposed surface of said second zone.

3. The composite according to claim 1, wherein said fiber length of said fibers of said second zone is in a range from 0.01 to 50 mm.

4. The composite according to claim 1, wherein said fiber length of said fibers of said second zone is in a range from 0.01 to 20 mm.

5. The composite according to claim 1, wherein said second zone has a fiber length gradient, expressed as a ratio of longest fiber length to shortest fiber length, that is above 20.

6. The composite according to claim 1, wherein said fiber bundle thickness of said second zone is in a range from 8 μm to 3000 μm.

7. The composite according to claim 2, wherein at least one of said fibers of said second zone and said further fibers of said third zone are high-temperature-resistant fibers based on a material selected from the group consisting of carbon, silicon, boron, nitrogen, tungsten, aluminum and compounds thereof.

8. The composite according to claim 7, wherein said fibers and said further fibers have a coating selected from the group consisting of carbon coatings, graphite coatings and carbide coatings.

9. The composite according to claim 1, wherein said second zone further contains fillers formed of at least one component selected from the group consisting of silicides, carbides, borides, nitrides, metals and mixtures thereof.

10. The composite according to claim 9, wherein a mass fraction of said fillers in said second zone is up to about 50%, based on a mass of a starting mixture for said second zone.

11. The composite according to claim 1, wherein said first monolithic ceramic zone is made up of a composite ceramic having an SiC content of more than 50% by weight and is formed by liquid infiltration of silicon into a carbon-containing intermediate body.

12. The composite according to claim 11, wherein said carbon-containing intermediate body is formed predominantly from at least one material selected from the group consisting of carbon felt, graphite, graphite material and carbon.

13. The composite according to claim 1, wherein said first monolithic ceramic zone further contains fillers selected from the group consisting of N, B, Al, C, Si, Ti, Zr, W, and compounds thereof, in proportions by mass of from 20 to 50%.

14. The composite according to claim 1, wherein a ratio of a thickness of said first monolithic ceramic zone to said second zone is in a range from 1:2 to 2:1.

15. The composite according to claim 1, wherein a thickness of said first monolithic ceramic zone and also a thickness of said second zone is in a range from 1 to 100 mm.

16. The composite according to claim 11, wherein said carbon-containing intermediate body is formed from a material selected from the group consisting of coated fibers, woven fabrics, lay-ups and knitted fabrics having fibers aligned predominantly within a plane perpendicular to a buildup of layers.

17. The composite according to claim 2, wherein a mean fiber length of said further fibers of said third zone is greater than 50 mm.

18. The composite according to claim 1, wherein said first monolithic ceramic zone has stress relief grooves formed therein.

19. The composite according to claim 1, wherein a ratio of thicknesses of said first, second and third zones is in a range from 1:2:2 to 2:1:1, respectively.

20. The composite according to claim 13, wherein said fillers are selected from the group consisting of TiC, $TiSi_x$, $TiB_x$, TiC, WC, $B_4C$, SiC, BN, $Si_3N_4$ and SiCBN ceramics.

21. A structural component, comprising:
  a fiber-reinforced composite, containing:
    a first monolithic ceramic zone formed predominantly from silicon carbide, silicon and carbon, said first monolithic ceramic zone having sides; and
    a second zone containing a composite ceramic reinforced with fibers and disposed on one of said sides of said first monolithic ceramic zone, said fibers having a fiber length and a fiber bundle thickness, the fiber length or the fiber length in conjunction with the fiber bundle thickness of said fibers increasing gradually in said second zone from a side facing said first monolithic ceramic zone to a side facing away from said first monolithic ceramic zone.

* * * * *